Dec. 3, 1963    K. GROSSKOPF    3,112,998
REAGENT FOR DETECTION OF ARSENIC HYDRIDE OR PHOSPHOROUS HYDRIDE
Filed Nov. 27, 1961
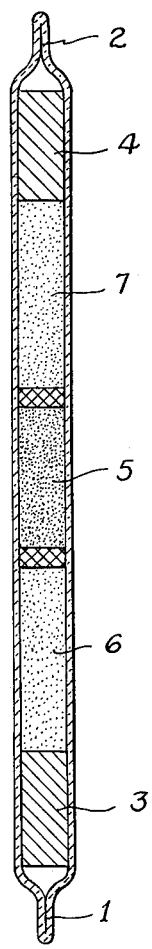
INVENTOR
Karl Grosskopf
BY Bailey, Stephens, & Huettig
ATTORNEYS

United States Patent Office 3,112,998
Patented Dec. 3, 1963

3,112,998
REAGENT FOR DETECTION OF ARSENIC HYDRIDE OR PHOSPHOROUS HYDRIDE
Karl Grosskopf, Lubeck, Germany, assignor to Otto Heinrich Drager, Lubeck, Germany
Filed Nov. 27, 1961, Ser. No. 154,947
Claims priority, application Germany Dec. 27, 1960
2 Claims. (Cl. 23—254)

This invention relates to the detection of substances in gases and, in particular, is directed to a reagent adapted to be placed in a detector tube for determining the presence of arsenic hydride or phosphorous hydride in gases.

It is known that the presence of arsenic hydride and phosphorous hydride in gases can be determined by the use of a single metal salt and specifically with the use of a single precious metal salt. It is also known to detect these hydrogen compounds by means of gold chloride or mercuric chloride. These metal salts are reduced by the hydrogen compounds and thereby produce the characteristic colors of the colloidal separated metals. It is also known to deposit these reagents upon a granular carrier which is then placed in a detector tube.

The object of this invention is to increase the sensitivity of the known detector reagents. This invention produces a reagent composed of a metal salt and deposited upon a granular carrier placed in a detector tube for the determination of arsenic hydride and phosphorous hydride in gases. According to this invention, the reagent is composed of a mixture of at least one precious metal salt and, for example, a mercury salt. Thus the reagent of this invention has the advantage in that it is considerably more sensitive than heretofore known reagents used for the same purpose.

One very sensitive reagent of this invention is composed of a mixture of about 0.2 to 0.3 gram of gold chloride and about 0.1 to 0.3 gram of mercuric chloride, the mixture being deposited upon 100 grams of a granular carrier.

The means by which the objects of the invention are obtained are described more fully with reference to the accompanying drawing which is a diagrammatic cross-sectional view through a detector tube.

The transparent detector tube has sealed ends 1 and 2, respectively. Adjacent each end is a layer of packing material 3 and 4. In the center of the tube is the reagent layer of this invention. Between the packing layers 3 and 4 are layers 6 and 7 comprising a preliminary gas purification layer for the removal of hydrogen sulphide from the gases before the gases reach the reaction layer 5.

The reaction layer 5 was produced by depositing a solution containing 0.25 gram of gold chloride, 0.16 gram of mercuric chloride, and 0.34 milliliter of concentrated hydrochloric acid in 25 milliliters of water upon 100 grams of granular pure silica gel having a bulk weight of 500±50 grams per liter and a particle size of from 0.3 to 0.4 mm.

The reaction layer 5 so constituted can determine the presence of 0.025 microgram of arsenic hydride contained in gases drawn through the detector tube. By comparison, when mercuric chloride was omitted from the reagent layer, no color change occurred in the reagent layer below 0.13 microgram of arsenic hydride. Again, when the gold chloride was omitted from the reagent layer and the amount of mercuric chloride doubled or tripled, no color change below the presence of 0.13 microgram in the gases occurred. Therefore, the reagent of this invention has about five times the sensitivity of heretofore used reagents.

The reagent gave successful results when prepared with a gold chloride content ranging from 0.2 to 0.3 gram per 100 grams of silica gel comprising the ceramic carrier. Also, the amount of mercuric chloride can be from about 0.1 to 0.3 gram for every 100 grams of silica gel.

To make the detector tube specific for the determination of arsenic hydride or phosphorous hydride, it is preferable to employ the gas purification layers 6 and 7. Each of these layers is composed of 100 grams of pure granular silica gel having a bulk weight of about 500 grams per liter and a particle size of about 1.0 to 1.2 mm. impregnated with a solution composed of about 0.6 to 0.7 gram of lead acetate in 25 milliliters of water.

These purification layers absorb all of the hydrogen sulphide contained in the gases and which could disturb the reaction in layer 5. In layers 6 and 7, the arsenic hydride and phosphorous hydride were not removed from the gases. The reaction layer 5 lies between the two purification layers 6 and 7 so that the gas to be tested can be drawn through either end of the detector tube. The 0.025 microgram amount of arsenic hydride detected corresponds to one liter of air having 0.008 part per million of arsenic hydride. This concentration of arsenic hydride was indicated by a distinctly seen grayish-black ring at the entry end to reaction layer 5. Higher concentrations are likewise easily indicated with smaller amounts of gas being drawn through the detector tube. In addition to the determining of the presence of arsenic hydride and phosphorous hydride in gases drawn through the detector tube, the presence of antimony hydride can also be indicated.

The sensitivity of indication is, in general, proportional to the molar weight of the hydrogen compound and it is therefore advantageous to calibrate the detector tube for parts per million and not for parts by weight per volume. A calibration curve based on parts per million prepared for arsenic hydride is also correctly usable for phosphorous hydride or antimony hydride.

Having now described the means by which the objects of the invention are obtained, I claim:

1. A reagent composition for use in a detector tube to determine the presence of arsenic hydride or phosphorous hydride in gases comprising a mixture of 0.2 to 0.3 gram of gold chloride and 0.1 to 0.3 gram of mercuric chloride, said mixture being deposited upon 100 grams of granular carrier.

2. A detector tube for the colorimetric determination of arsenic hydride or phosphorous hydride in gases comprising, in the direction of the gas flow, a preliminary gas purification layer for the removal of hydrogen sulphide from the gas, and a second layer comprising a mixture of gold chloride and mercuric chloride, said mixture being deposited upon a granular carrier.

References Cited in the file of this patent
UNITED STATES PATENTS
2,054,885    Schroter _____ Sept. 22, 1936

OTHER REFERENCES

Nelson et al.: "Analytical Chemistry," vol. 29, pages 1665 and 1666 (1957). Copy in Division 59.

"Analytical Abstracts," volume 4, page 1689 (1957). Copy in Division 59.

"Chemical Abstracts," volume 52, page 8837 (1958). Copy in Division 6.